United States Patent [19]
Ota et al.

[11] Patent Number: 5,559,928
[45] Date of Patent: Sep. 24, 1996

[54] MIN-MAX COMPUTING CIRCUIT FOR FUZZY INFERENCE

[75] Inventors: Ken Ota, Yokohama, Japan; William Archibald, Austin, Tex.

[73] Assignee: Motorola Inc., Schaumburg, Ill.

[21] Appl. No.: 382,957

[22] Filed: Feb. 2, 1995

Related U.S. Application Data

[63] Continuation of Ser. No. 195,949, Feb. 14, 1994, abandoned.

[30] Foreign Application Priority Data

Mar. 31, 1993 [JP] Japan ..................... 5-097154

[51] Int. Cl.$^6$ ................. G06F 7/00; G06F 9/44
[52] U.S. Cl. ................. 395/3; 395/900
[58] Field of Search ................. 395/3, 61, 900

[56] References Cited

U.S. PATENT DOCUMENTS

| | | | |
|---|---|---|---|
| 4,875,184 | 10/1989 | Yamakawa | 395/3 |
| 5,142,664 | 8/1992 | Zhang | 395/3 |
| 5,179,634 | 1/1993 | Matsunago et al. | 395/61 |
| 5,280,624 | 1/1994 | Ikeda | 395/900 |
| 5,299,283 | 3/1994 | Hamamoto | 395/61 |

*Primary Examiner*—Robert W. Downs

[57] ABSTRACT

In a fuzzy inference system comprising a plurality of fuzzy rules including input labels as antecedents, a min-max computing circuit for executing rain-max computation on input label grades is disclosed. The min-max computing circuit comprises an input label sorter (10) for sorting all input label grades in their magnitude order; a rule bits generating means for generating encoded rules(20), each of said encoded rules comprising a plurality of valid/invalid bits, each of which representing whether or not corresponding input label is included in the antecedent of each of said rules; and a min-max computing logic devices (30, 40) for executing min-max computations on the input label grades according to the grade's magnitude order.

18 Claims, 9 Drawing Sheets

```
                 0.9  0.7  0.65 0.62 0.55 0.45 0.2  0.06 0.0
RULE α₁  IF                                    B AND Ⓐ  THEN α⎤
RULE α₂  IF         C              AND         Ⓑ        THEN α⎪
RULE α₃  IF              E              AND         Ⓕ   THEN α⎬
RULE α₄  IF                             G AND M AND Ⓝ   THEN α⎦
RULE β₁  IF         C         AND  Ⓓ                    THEN β
RULE γ₁  IF    H                                   Ⓘ    THEN γ⎤
RULE γ₂  IF                   L              AND   ⒿANDⓀ THEN γ⎦
```

FIG.8

| | INPUT LABEL | A | B | C | D | E | F | G | H | I | J | K | L | M | N | |
|---|---|---|---|---|---|---|---|---|---|---|---|---|---|---|---|---|
| | CODE | a | b | c | d | e | f | g | h | i | j | k | l | m | n | |
| | γ₂ | 0 | 0 | 0 | 0 | 0 | 0 | 0 | 0 | 0 | 1 | 1 | 1 | 0 | 0 | ⎫γ |
| | γ₁ | 0 | 0 | 0 | 0 | 0 | 0 | 0 | 1 | 1 | 0 | 0 | 0 | 0 | 0 | ⎭ |
| | β₁ | 0 | 0 | 1 | 1 | 0 | 0 | 0 | 0 | 0 | 0 | 0 | 0 | 0 | 0 | }β |
| CODED RULE | α₄ | 0 | 0 | 0 | 0 | 0 | 0 | 1 | 0 | 0 | 0 | 0 | 0 | 1 | 1 | ⎫ OUTPUT LABEL |
| | α₃ | 0 | 0 | 0 | 0 | 1 | 1 | 0 | 0 | 0 | 0 | 0 | 0 | 0 | 0 | ⎪ |
| | α₂ | 0 | 1 | 1 | 0 | 0 | 0 | 0 | 0 | 0 | 0 | 0 | 0 | 0 | 0 | ⎬α |
| | α₁ | 1 | 1 | 0 | 0 | 0 | 0 | 0 | 0 | 0 | 0 | 0 | 0 | 0 | 0 | ⎭ |

RULE-ASSOCIATIVE-BIT-GROUP

FIG.9

| | INPUT LABEL → | H | C | E | L | D | G | M | B | I | F | K | A | N | J | |
|---|---|---|---|---|---|---|---|---|---|---|---|---|---|---|---|---|
| | CODE → | h | c | e | l | d | g | m | b | i | f | k | a | n | j | |
| | GRADE → | .9 | .7 | .65 | .62 | .55 | .45 | .2 | .06 | 0 | 0 | 0 | 0 | 0 | 0 | |
| | γ₂ | 0 | 0 | 0 | 1 | 0 | 0 | 0 | 0 | 0 | 0 | 1 | 0 | 0 | ① | ⎫γ |
| | γ₁ | 1 | 0 | 0 | 0 | 0 | 0 | 0 | 0 | ① | 0 | 0 | 0 | 0 | 0 | ⎭ |
| | β₁ | 0 | 1 | 0 | 0 | ① | 0 | 0 | 0 | 0 | 0 | 0 | 0 | 0 | 0 | }β |
| CODED RULE | α₄ | 0 | 0 | 0 | 0 | 0 | 1 | 1 | 0 | 0 | 0 | 0 | 0 | ① | 0 | ⎫ OUTPUT LABEL |
| | α₃ | 0 | 0 | 1 | 0 | 0 | 0 | 0 | 0 | 0 | ① | 0 | 0 | 0 | 0 | ⎪ |
| | α₂ | 0 | 1 | 0 | 0 | 0 | 0 | 0 | ① | 0 | 0 | 0 | 0 | 0 | 0 | ⎬α |
| | α₁ | 0 | 0 | 0 | 0 | 0 | 0 | 0 | 1 | 0 | 0 | 0 | ① | 0 | 0 | ⎭ |

|  | RULE (5) | | | | OUTPUT LABEL (8) (5) | | | (5) | |
|---|---|---|---|---|---|---|---|---|---|
| INPUT LABEL (72) | $\alpha_1$ | $\alpha_2$ | ... | $\alpha_5$ | $\beta_1$ ... $\beta_5$ | | | $\theta_1$ ... $\theta_5$ | |
| A | 1 | 0 | ... | 0 | 0 | ... | 0 | 1 ... 0 | |
| B | 1 | 1 | ... | 0 | 0 | ... | 0 | 0 ... 1 | |
| C | 0 | 1 | ... | 0 | 1 | ... | 0 | 0 ... 0 | |
| D | 0 | 0 | ... | 0 | 1 | ... | 0 | 1 ... 0 | |
| ⋮ | | | | | | | | | |
| N | 0 | 0 | ... | 0 | 0 | ... | 0 | 1 ... 1 | |

RULE-ASSOCIATIVE-BIT-GROUP (40 BITS)

FIG. 12

DISCRIMINATOR OF INPUT LABEL INCLUDED CORRESPONDING RULE (MAXIMUM 5)

|  | RULE (5) | | | OUTPUT LABEL (8) (5) | | | (5) | |
|---|---|---|---|---|---|---|---|---|
| $\alpha_1$ | $\alpha_2$ | ... | $\alpha_5$ | $\beta_1$ ... $\beta_5$ | | | $\theta_1$ ... $\theta_5$ | |
| a | b | ... | — | c | ... | g | a ... j | |
| b | c | ... | — | d | ... | h | c ... k | |
| — | — | ... | — | — | ... | i | e ... n | |
| — | — | ... | — | — | ... | — | m ... — | |
| — | — | ... | — | — | ... | — | n ... — | |

FIG. 13

DISCRIMINATOR INCLUDING CORRESPONDING INPUT LABEL (5)

| INPUT LABEL (72) | | | | | |
|---|---|---|---|---|---|
| A | $\alpha_1$ | $\delta_2$ | $\zeta_3$ | $\eta_2$ | $\theta_3$ |
| B | $\alpha_1$ | $\alpha_2$ | $\zeta_1$ | $\zeta_1$ | $\eta_3$ |
| C | $\alpha_2$ | $\beta_1$ | $\delta_1$ | $\kappa_2$ | — |
| D | $\beta_1$ | $\gamma_3$ | $\phi_2$ | $\phi_3$ | $\theta_2$ |
| ⋮ | ⋮ | ⋮ | ⋮ | ⋮ | ⋮ |
| N | $\alpha_3$ | $\beta_4$ | $\delta_5$ | $\varepsilon_3$ | $\eta_3$ |

MIN-MAX COMPUTING CIRCUIT FOR FUZZY INFERENCE

This application is a continuation of prior application Ser. No. 08/195,949, filed Feb. 14, 1994, now abandoned.

FIELD OF THE INVENTION

The present invention relates, in general, to a fuzzy inference system which is utilized for controlling various consumer electronics, automobiles and the like. More particularly, the invention relates to a min-max computing circuit used in the fuzzy inference system. The min-max computing circuit performs min-max operations on grades of input labels generated in the inference system, in order to produce output label grades.

BACKGROUND OF THE INVENTION

It is well known in the art to use fuzzy logic control systems based on fuzzy inference in controlling various consumer electronics, household appliances, automobiles, cameras and the like. In the fuzzy logic control systems, in general, if fuzzy conception or fuzzy condition "A" is true, then control "a" is executed. This proposition is represented by a fuzzy rule "if A then a". More specifically, control "a" is executed in a degree determined by how well a fact indicated by input data conforms to fuzzy conception "A". In this fuzzy rule, A is referred to as an "antecedent" and a as a "consequent". The degree of conformity of the fact to fuzzy conception A is called the "grade". It is necessary to calculate such grade with regard to each fuzzy conception. An input label is used for identifying each input fuzzy conception or condition. Accordingly, a fuzzy conception is also referred to as an input label. An output label is also used for identifying each output fuzzy conception or control included in the consequent of a fuzzy rule. Therefore, an output fuzzy conception is referred to as an output label.

In the fuzzy inference system mentioned above, multiple input channels are provided to receive multiple input data values indicating parameters such as velocity, pressure and temperature. Also, multiple input labels are defined in each of the input channels. The system also has multiple output channels to produce multiple output data values such as on/off switch signal and valve control signal. Multiple output labels are also defined in each of the output channels. Therefore, the total number of the input label grades, each of which needs computation, becomes significantly large, being equal to the number of input channels times the number of input labels per input channel. Further, as discussed below, min-max computation on the input label grades is necessary for each of the output labels in order to choose the adequate output labels.

The min-max computation on the input label grades will be explained below with reference to the following illustrative example, which includes 7 fuzzy rules.

| Rule $a_1$ | if A and B | then a |
| Rule $a_2$ | if B and C | then a |
| Rule $a_3$ | if E and F | then a |
| Rule $a_4$ | if G and M and N | then a |
| Rule $b_1$ | if C and D | then b |
| Rule $g_1$ | if H and I | then g |
| Rule $g_2$ | if J and K and L | then g |

The antecedents of these rules include input labels A through N, and the consequents include output labels a through g. It is assumed that grades Ag through Ng of the input labels A through N have the following values.

Ag= 0, Bg= 0.06, Cg= 0.7, Dg= 0.55, Eg= 0.65, Fg= 0, Gg=0.45, Hg=0.9, Ig=0, Jg=0, Kg=0, Lg=0.62, Mg= 0.2, Ng= 0.

First, instead of an AND operation, a min computation is performed on each rule, which detects the minimum grade among the grades of the input labels for each rule. For example, the antecedent of rule $a_1$ includes input labels A and B with grades being Ag= 0 and Bg= 0.06. Therefore, Ag(=0) is selected as the minimum grade since Ag is smaller than Bg. Similarly, rule $a_2$ selects grade Bg(=0.06) of input label B and rule $a_3$ selects grade Fg(=0) of input label F. The rule $a_4$ selects grade Ng(=0).

Then, instead of an OR operation, a max computation is performed for each of the output labels to detect the maximum grade among the previously detected minimum grades of rules which have the same output label as their consequents. For example, regarding rules $a_1$, $a_2$, $a_3$ and $a_4$ all having the same output label a, grade Bg(=0.06) is selected as the maximum grade among minimum grades Ag, Bg, Fg and Ng. Similar max computations are performed for other output labels b and g, choosing grade Dg(=0.55) for output label b and Ig= Jg= Kg=0 for g respectively.

Prior art fuzzy control systems have been used mainly in low speed control applications such as home appliances. However, when fuzzy control systems are desired to be used in high speed and relatively complicated control applications such as automobile cruise controls or suspension control of vehicles, computing speed should be significantly improved to approximately 1000 times faster than the speed required by a more conventional application. The improvement of the computation speed is achieved by synergistically tuning three computation stages: the grade calculations of input labels, the min-max operations performed on the input label grades to obtain output label grades, and the calculations of center of gravity of output label's membership functions.

Conventional min operations on input label grades have been carried out by comparing each of input label grades with all other input label grades one by one. A typical example of such comparison is a Japanese patent number 4-10133 describing comparison achieved by software program. These comparisons by software, however, have difficulty in improving their computing speed because of a large number of magnitude comparisons. Another typical example of comparison achieved by hardware is Japanese patent number 2-159628. This type of solution also has difficulty in improving its execution speed because of a large number of comparison circuits needed for respective input labels. Additionally, manufacturing cost reduction is also difficult in the second solution cited herein.

In a typical fuzzy inference system comprising input channels including a plurality of input labels, most input label grades are equal to zero. For example, if every membership function crosses only to neighboring functions in each of input channels, then at most two non- zero grades are output from each input channel. Therefore, 70–80% of the input label grades on which the min-max operation is performed are zeros. The zero grade, occupying most of input labels, has peculiarity in a sense that it does not contribute to the results of the min-max operations. However, in prior min-max operations, the zero grades were processed in the same manner as non-zero grades. Thus, many redundant operations were executed resulting in slow operation speed and large hardware size.

SUMMARY OF THE INVENTION

Accordingly, it is an object of the present invention is to provide an improved min-max computing circuit for fuzzy inference system.

More particularly, it is an object of the present invention to provide such an improved min-max computing circuit with both fast computation speed and reduced hardware size.

These and other objects and advantages of the present invention will be apparent from the detailed description below taken together with the drawings.

BRIEF DESCRIPTION OF THE DRAWINGS

FIG. 8 is a chart illustrating input labels included in antecedents of fuzzy rules.

FIG. 9 is a chart illustrating an example of encoded rules comprising valid/invalid bits to be generated in a bits generating circuit 20 shown in FIG. 1.

FIG. 10 is a chart illustrating rule-associative-bit-groups arranged in magnitude order of input label grades.

FIG. 11 is a chart illustrating a method according to prior art in which encoded rules or rule associative bit groups are made and stored in a rule memory prior to min-max operation.

FIG. 12 is a chart illustrating a method according to an embodiment of the present invention in which encoded rules or rule associative bit groups are generated through min-max operation.

FIG. 13 is a chart illustrating a method according to another embodiment of the present invention in which encoded rules or rule associative bit groups are generated through min-max operation.

DETAILED DESCRIPTION OF THE INVENTION

To facilitate understanding the present invention, an outline of a min-max computation according to the invention will be described first.

Figure 1:
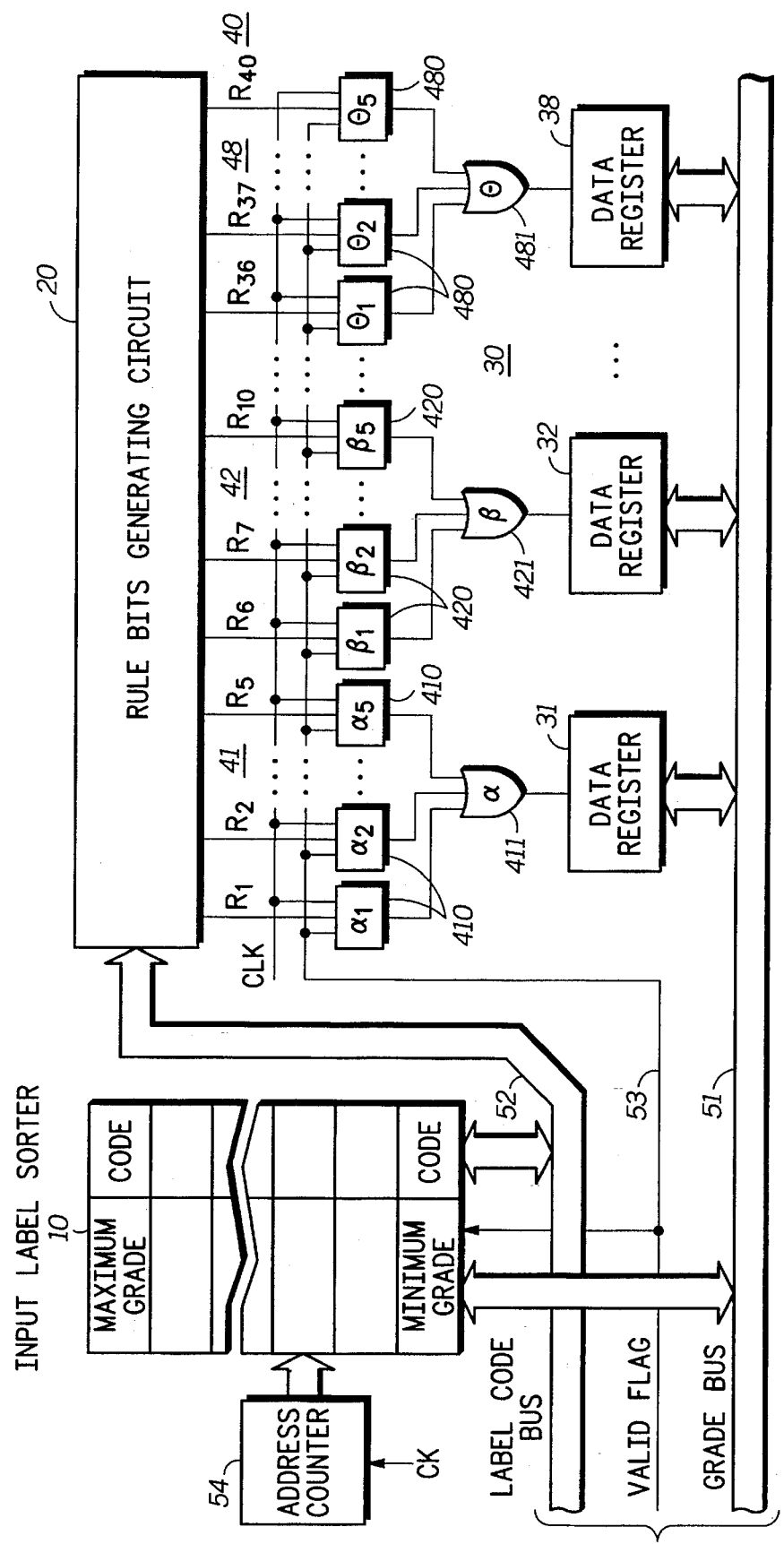
FIG. 1 shows a block diagram of a min-max computing circuit according to a preferred embodiment of the present invention.

According to the present invention, an input label sorter, element 10 of FIG. 1, sorts input labels in magnitude order of their grades. For example, 14 input labels A through N, which are included in the seven rules illustrated above and may have been alphabetically arranged originally, can be rearranged or sorted in magnitude order of their grades as shown in FIG. 8.

After the input labels are sorted according to their grade magnitudes, the input label at the right most in each rule has the minimum grade(marked with a circle in FIG. 8). Among the marked minimum labels relevant to the same output label, the input label at the left most has the maximum grades (marked with double circles). In this manner, the sorting facilitates the min-max computing.

In order to achieve the sorting function and the min-max detecting function as shown in FIG. 8, the present invention prepares a plurality of encoded rules wherein each of the plurality of encoded rules is defined for a respective fuzzy rule. The encoded rule for each fuzzy rule comprises a valid/invalid bit array and represents which input labels are included in each respective rule, as shown in FIG. 9. The input labels are alphabetically ordered in every rule. A valid bit "1" means that an associated input label (for example, label "A") is included in a rule $a_1$. An invalid bit "0" means that an associated label ("C") is not included in rule $a_1$. It is understood from the valid/invalid bit array shown in FIG. 9 that the only input labels A and B are included in the antecedent of rule $a_1$. Similarly the bit array in FIG. 9 represents that only labels C and D are included in antecedent of rule $b_1$. Thus, the encoded rule $a_1$ is described as "11000000000000" and the encoded rule $b_1$ is described as "00110000000000" as shown in FIG. 9.

Two dimensional arrays of the valid/invalid bits shown in FIG. 9 can be obtained by arranging the encoded rules. All the encoded rules with the same output labels should be adjacent to one another. In this manner, a bit matrix is obtained. Each row of bits represents the input labels included in a rule associated with that row. Each column of bits represents which output labels are related to an input label associated with the column.

Each of the columns of bit streams is referred to as a "rule-associative-bit-group" of a respective input label. For example, the rule-associative-bit-group of input label A shown in FIG. 9 is "1000000" and input label N's is "0001000". These rule-associative-bit-groups are stored in a storage device, such as a ROM memory, and an associated input label is used to address the rule associative group. Therefore, the rule associative-bit-groups can be accessed with identification label codes "a" through "n". A memory defined in this manner is referred to as "rule memory" or "rule ROM." The input label's identification codes used as read addresses for the rule memory are referred to as "label codes".

Then, the rule-associative-bit-groups shown in FIG. 9 are sorted in magnitude order of their input label grades to get a result shown in FIG. 10. The spatial arrangement illustrated in FIG. 10 corresponds to the arrangement in FIG. 8. The sorting from FIG. 9 to FIG. 10 does not affect the fuzzy rules or encoded rules. For instance, the rule "if A and B then X" and rule "if B and A then X" are substantially the same.

The right most valid bit ("1") for each encoded rule shown in FIG. 10 can be detected as the minimum grade bit (marked with a circle). Then the left most valid bit can be detected for each output label among the previously detected minimum grade bits. Thus, the detected left most bit is the maximum grade bit (marked with double circles). An input label grade associated with the maximum grade bit is the min-max computation result to be obtained. The min-max operations can be realized by various software and hardware methodologies.

The min-max operations can be achieved by a sequential scheme in which rule-associative-bit-groups read out from the rule memory in grade magnitudes' order are processed sequentially, as disclosed in a prior Japanese patent application Hei 4-332401 filed by the present applicant. The min-max operations can also be achieved by a spatial scheme in which rule-associative-bit-groups read out from the rule memory in grade magnitudes' order are arranged spatially in shift registers, as disclosed in a prior Japanese patent application Hei 4-332402 filed by the present applicant.

To place each of rule-associative-bit-groups in a sequential order, input label codes are sequentially supplied to the rule memory according to their grade magnitudes' order. A minimum grade detector is provided at each output position of the rule memory to receive data bits forming each of the encoded rules. The minimum grade detector detects the minimum grade of the rule-associative-bit-group based on two pieces of information an input label grade (or sort-pointer) supplied from the input label sorter and a valid bit appearing last (or first) in each row of bits supplied from the rule memory. For example, if the rule memory is accessed in an increasing order of the grade magnitudes, the minimum grade detector can detect a first grade with a valid bit as a minimum grade. If the rule memory is accessed in decreasing order of the grade magnitudes, the minimum grade detector can detect a last appearing grade with a valid bit as the minimum grade. Further, a maximum grade detector is provided a each output label. The maximum grade detector detects the maximum grade out of the detected minimum grades for each relevant rule.

The min-max operations can be realized by either software or hardware schemes, as mentioned above. In either software or hardware schemes, sorting input labels in the order determined by the magnitude of their corresponding grades significantly improves execution time. In prior art min-max computations, comparison is repeatedly performed on every input label in each rule, one by one. If there are 10 rules having input labels A and B, prior art system executes the grade comparison between A and B for each rule, thus the same comparison is repeated 10 times. According to an aspect of the present invention, only one comparison between A and B is enough even if input labels A and B appear in many rules.

According to the prior Japanese patent applications cited above, the rule-associative-bit-groups are stored in the rule memory. However, according to an aspect of the present invention, a bits generating circuit for generating rule-associative-bit-groups through min-max operation is provided instead of the rule memory. The bits generating circuit consists of a plurality of bits generating sub-circuits wherein each of the plurality of bits generating sub-circuits corresponds to a fuzzy rule. Each of the bits generating sub-circuits includes a memory for storing each of label codes of input labels included in the fuzzy rule. Each of the sub-circuits also includes a matching circuit for matching label codes successively supplied from the input label sorter, with input label codes stored in the memories. Each of the matching circuit generates a valid or a non-valid bits as a result of the matching operation.

According to the above said scheme of the present invention, the area required by the memories for storing input label codes to generate the rule-associative-bit-groups is significantly reduced from the amount of storage required for rule memory disclosed in the previously cited patents. This will be discussed below.

If eight input channels are defined in a fuzzy inference system, and nine input labels are defined in each of the input channels, there will be seventy two input labels named for example A, B, C...N. Further, if there are eight output labels named for example a–q in each of output channels and there is a maximum of five rules having each of the output labels, at most forty rules can be defined in each of the output channels. An example of a data format of the rule-associative-bit-groups to be stored in the rule memory in this case according to the prior applications will be as shown in FIG. 11. Total number of the bits of the rule-associative- bit-groups in each output channel will be 1(bit)×40×72=2,880(bits).

In an embodiment of the present invention which will be described later in more detail and with reference to FIG. 1 and FIG. 2, a number of input labels included in each of the above said forty rules is assumed to be a maximum of five, and each of the input label codes used to discriminate among the above said seventy two input labels is assumed to be comprised of seven bits of binary data. In this case, an example of data format of the input label codes to be stored in the bits generating circuit for each output channel will be such as shown in FIG. 12. A total number of bits of all the input label codes will be 7(bit)×40×5=1,400(bits) which is significantly smaller than the total number of the bits of the rule-associative-bit-groups in the case of the prior art shown FIG. 11.

In another embodiment of the present invention which will be described in more detail and with reference to FIG. 1 and FIG. 6, if a number of rules including each of the seventy two input labels in each of the antecedent has a maximum value of five, and if each of the discriminators for discriminating forty rules is comprised of six bits of binary data, an example of a data format of the discriminators of the rules to be stored in the bits generating circuit to indicate they include the corresponding input labels will are illustrated in FIG. 13. A total number of the bits of all the discriminators will be 6(bits)×5×72=2,160(bits) which is smaller than the total number of the bits of the rule-associative-bit-groups in the case of the prior art shown in FIG. 11.

FIG. 1 is a block diagram of a min-max operation circuit according to an embodiment of the present invention. The circuit includes an input label sorter 10 which sorts input label grades with their label codes according to magnitude order of the input grades. Label sorter 10 also includes a rule bits generating circuit 20, a group of grade registers 30 corresponding to a plurality of output labels (a, b, q), a group of logic circuits 40 corresponding to a plurality of fuzzy rules, a grade bus 51, a label code bus 52 and a valid flag signal line 53. A back-end stage comprises rule bits generating circuit 20, a group of grade registers 30 and a group of logic circuits 40. The back end stage is illustrated with only one output channel for convenience.

The grade of each input label is calculated by a grade computing circuit (not shown) and supplied onto grade bus 51 in the originally arranged order of the input labels. In a typical system having 3 input channels and 6 input labels in each channel, the total of 18 input label grades appear on grade bus 51. At the same time that an input label grade appears on grade bus 51, its associated input label code for discriminating input labels from one another appears on label code bus 52.

In a typical fuzzy inference operation, most input label grades appearing on grade bus 51 are equal to zero. For example, if each input channel has 6 input labels and each of the input label membership functions crosses only neighboring membership functions, then a maximum of two non-zero grades are outputted from each input channel. That is, out of total 18 input grades in total 3 input channels, a maximum of 6 labels are non-zeros and the remaining 12 grades are equal to zero (referred to as "zero grade"). The min-max detector according to the invention effectively operates on zero grades occupying most of the input label grades to save execution time and reduce hardware size. For this purpose, the grade computing circuit provides a valid/invalid flag onto a valid flag signal line 53. The valid flag indicates non-zero grade, and the invalid flag indicates a zero grade.

Input label sorter 10 receives input label grades supplied from grade bus 51, throws away zero grades, and sort non-zero grades in their magnitude order. Input label sorter 10 basically comprises two groups of registers. One group stores input label grades and the other stores corresponding label codes. An example of the structure of input label sorter 10 will be described later in reference to FIG. 7.

After input label sorter 10 completes sorting grades and label codes, every grade register 31–38 is initialized to zero. Then, according to sequential addresses supplied from address counter 54, the input label grades in input label sorter 10 are output in increasing order (from small to large) of their magnitudes onto the grade bus 51. Simultaneously, associated label codes are output from input label sorter 10 onto the label code bus 52. Each of the label codes placed on the label code bus 52 is supplied to the bits generating circuit 20. Rule-associative-bit-groups generated in the bits generating circuit 20 are supplied to the group of logic circuits 40.

Figure 2:
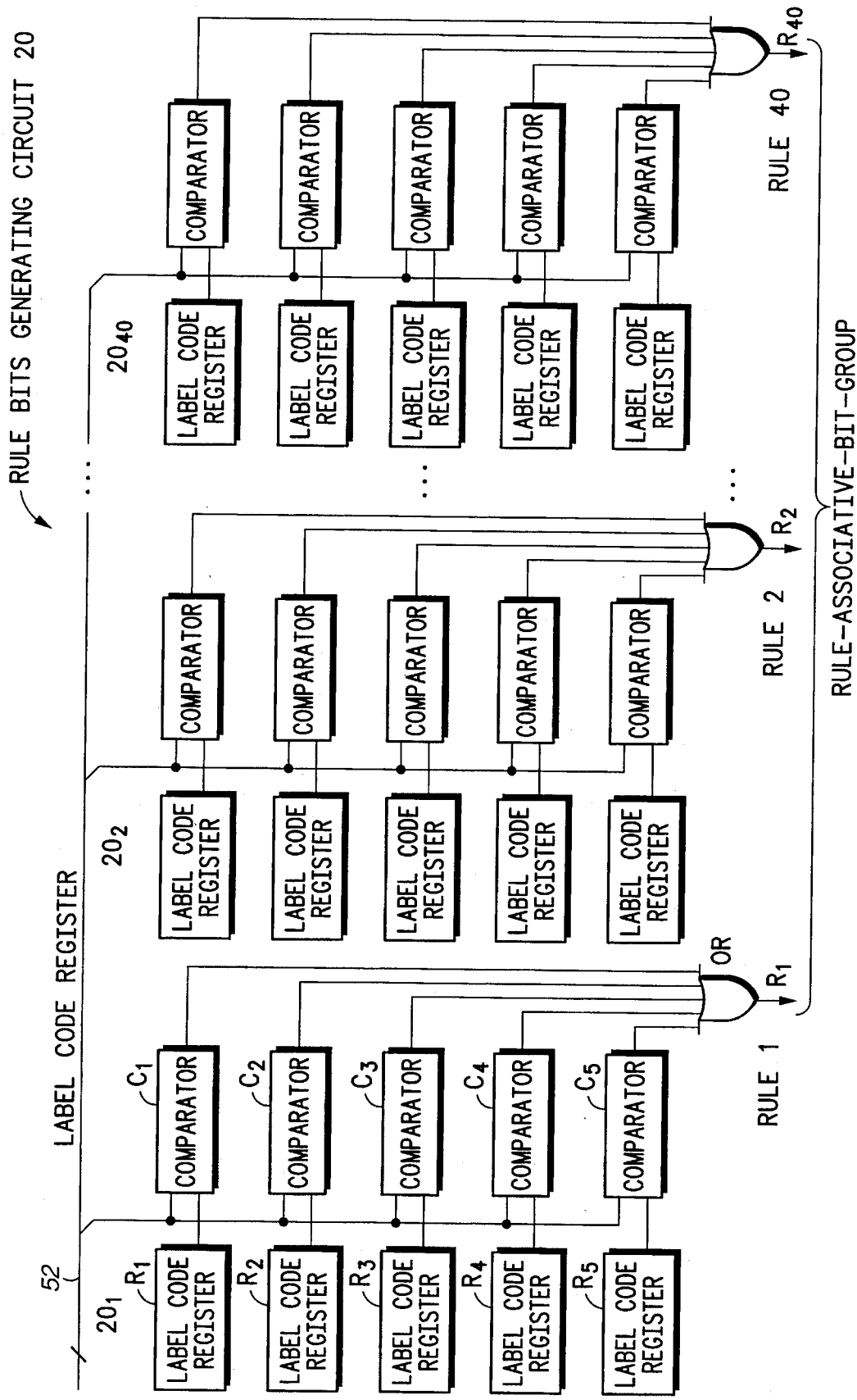
FIG. 2 is a detailed block diagram illustrating the structure of the rule bits generating circuit 20 shown in FIG. 1.

As shown in FIG. 2, the rule bits generating circuit 20 consists of forty sub-circuits $20_1$–$20_{40}$ each provided for a respective one of forty rules assumed in this embodiment. The sub-circuit $20_1$ includes five label code registers $R_1$–$R_5$. The number of the registers is equal to the number of input labels included in each corresponding rule. The sub-circuit $20_1$ also includes comparators $C_1$–$C_5$, which each compare label codes supplied successively through the label code bus 52 with the label code stored in each of corresponding label code registers, $R_1$–$R_5$. Each of the comparators, $C_1$–$C_5$, generates a valid bit "1" when the compared label codes are equal, and generates non-valid bit "0" when the compared label codes are not equal. The sub-circuit 201 further includes an OR gate for generating logical sum of the valid or non-valid bits which are output from each of the five comparators $C_1$–$C_5$. The output of the OR gate is supplied to the minimum grade detector in the logic circuit 41. Each of the other sub-circuits $20_2$–$20_{40}$ also consists of registers, comparators and an OR gate which operate similarly to those described in sub-circuit $20_1$.

Logic circuit 40, shown in FIG. 1, consists of 8 logic sub-circuits, 41, 42, . . . , 48, corresponding to 8 output labels, a, b, . . . q. Each logic sub-circuit comprises minimum grade detectors 410($a_1$–$a_5$), 420($b_1$–$b_5$), . . . , 480 ($q_1$–$q_5$) respectively and a maximum grade detector 411, 421, . . . , 481 respectively. The number of the minimum grade detectors in each logic sub-circuit is equal to the largest possible number of rules relevant to the corresponding output label. Each of maximum grade detectors 411, 421, . . . , 481 includes an OR gate for producing the logical sum of output signals from each of the minimum detectors.

Minimum grade detector 410($a_1$–$a_5$) outputs "1" to each of input terminals of OR gate 411 only when it detects the first valid bit "1" among a bit stream (encoded rule) supplied from the bits generating circuit 20. In other words, even though the second or third valid bit appears in the encoded rule, minimum detector 410 does not output "1". An example of a structure of the minimum grade detector 410 is described later with reference to FIG. 3.

Upon receiving "1" from OR gate 411, grade register 31 latches an input label grade currently appearing on grade bus 51. Therefore, each of the minimum grade detectors 410($a_1$–$a_5$) functions to enable data register 31 to store the input label grade which is first output from input label sorter 10 when the first valid bit is generated in the rule bits generating circuit 20 for each of the rules ($a_1$–$a_5$). Because the grades of input labels appear on grade bus 51 in increasing magnitudes order, the first input label grade appearing with a valid bit is the targeted minimum grade included in the antecedent of the corresponding rule. Thus each logic sub-circuit 410 performs a function to realize a part of the minimum computation.

Each of the grade registers 31, 32, . . . , 38 is provided for each of the output labels(a, b, . . . q). Every time a "1" is received from the minimum grade detector, the grade register 31 latches a current input label grade appearing on the grade bus 51 to replace old grade previously latched. Thus, when input label sorter 10 completes outputting all label grades contained therein, grade register 31 holds the minimum input label grade corresponding to minimum grade detector 410 which output a value of "1" last. Because each of the input label grades successively appears on grade bus 51 in increasing magnitudes order of the grades, the input label grade stored in grade register 31 is the largest grade among the group of minimum grades relevant to the corresponding output label.

Therefore, the minimum grade detectors 410, OR gate 411 and the grade register 31 perform a part of the min-max computation. The remaining part of the min-max operation is owed to the function of input label sorter 10 to output the smallest grade first onto the grade bus 10.

In this manner, when input label sorter 10 completes outputting a total 16 of non-zero grades, each grade register holds the input label grade which is a result of the min-max commutation performed on input label grades relevant to the corresponding output label. The resultant label grades stored in the grade registers 31–38 are transferred through grade bus 51 to the following stage, where a defuzzification operation such as the center of gravity calculation is performed to get final control outputs for each of the output channels.

Figure 3:
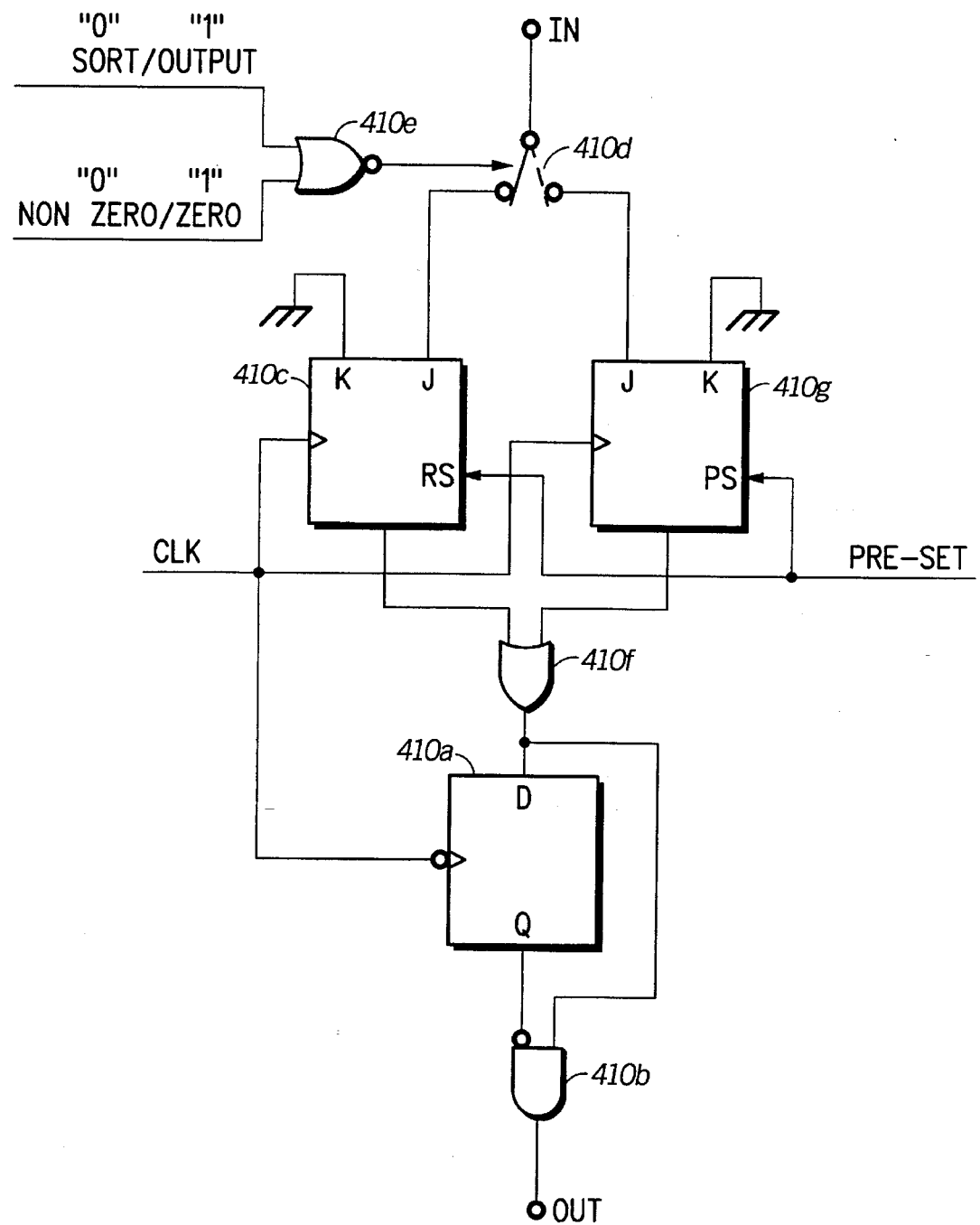
FIG. 3 is a detailed block diagram illustrating the structure of a minimum detector 410 shown in FIG. 1.

Each of the minimum grade detectors, as shown in FIG. 3, comprises a back stage including a D-type flipflop 410a and an AND gate 410b, and a front stage including two J-K flip-flops 410c and 410g, a switch circuit 410d, and two logic gates 410e and 410f. The main function of the minimum grade detector is to share part of the min-max operation performed on sorted input labels. The back stage performs a differential function to output "1" during a half clock period at the transition of "0" to "1" of the output signal of the OR gate 410f.

On the other hand, both J-K flipflop 410g and the OR gate 410f inhibit the back stage from performing the differential function on unused rules. Both J-K flipflop 410c and OR gate 410f inhibit the back stage from performing the differential function when any one of three cases occurs: an invalid input label of all that does not contribute to the corresponding rule appears during a sort operation, a valid input label contributing rules has a zero grade, or after the first valid bit has been detected, i.e., the minimum grade has been detected for a rule then further bits should be inhibited.

To one input terminal of NOR gate 410e, a signal is supplied, which indicates that the input label sorter 10 is performing either a sort operation ("0") or an output operation ("1"). The other input terminal of NOR gate 410e receives a signal from valid flag signal line 53, which indicates that current input label's grade to be sorted is either zero ("0") or non-zero ("1").

Before input label sorter 10 initiates its sorting operation on input label grades, a preset signal initializes J-K flipflop 410g to a "1" state and J-K flipflop 410c to a "0" state. The output of OR gate 410f provides "0". Then input label sorter 10 initiates the sort operation and the bits generating circuit 20 is accessed by label codes appearing on the label code bus 52. During the sort operation, one input terminal of the NOR gate 410e remains "0" as described above.

If the other input terminal of NOR gate 410e receives a "0" which indicates that current input label grade appearing on the grade bus 51 is a non-zero grade, then NOR gate 410e outputs a "1" and the switch turns to the state shown in FIG. 3 by a dotted line. In this state J-K flipflop 410g turns from the initial state "1" to "0" if an input terminal IN receives a valid bit "1" appearing in encoded rule. Then the output of OR gate 410f changes from "1" to "0". On the other hand, if the other input terminal of NOR gate 410e receives a "1" indicating a zero grade while input terminal IN is receiving a valid bit "1", then NOR gate 410e outputs a "0" causing switch 410d to trip to the state shown in FIG. 3 by a solid line. As a result J-K flipflop 410c trips from the initial state "0" to "1". Then the output of OR gate 410f becomes "1". In this manner, when the sort operation on input label grades is complete, the output of OR gate 410f is "0" if each of input label grades was not zero for each valid bit "1" included in associative encoded rule, otherwise it remains in the initial state "1". That is, the output state "1" of OR gate 410f is provided in either of two cases: any one of input label grades included in encoded rule was zero, or no valid bit "1" appeared in encoded rule.

After input label sorter 10 initiates its output operation of the sorted input label grades together with associative label codes, the input of NOR gate 410e receives a "1" and switch 410d trips to the state shown in FIG. 3 by a solid line. The valid/invalid bits of rules generated in the rule bits generating circuit 20 are supplied to J-input terminal of J-K flipflop 410c through switch 410d. If both J-K flip-flops 410c and 410g are in the state "0", then Q output of D flipflop 410a remains "0". Therefore a "0" is supplied to the inverting input terminal of AND gate 410b causing it to output a "1" during a half clock period through output terminal OUT at the time the valid/invalid bit trips to "1" for the first time. As a result, grade register 31 latches a current input label grade on grade bus 51.

On the other hand, if either J-K flipflop 410c or 410g is in the state "1" when the grade sorter 10 initiates its output operation of the sorted input label grades, then the "1" signal on the inverting input terminal of AND gate 410b keeps output terminal OUT as "0". That is, the latching of input label grade is inhibited. In this manner, minimum grade detector 410 is inhibited from performing the minimum computation in either one of two cases: any one of input label grades included in the antecedent of the corresponding encoded rule was zero or the encoded rule was an unused rule having no input label in its Antecedent. Such an inhibiting function is needed due to the following reasons.

For a first reason, although input label sorter 10 discards zero grade input labels, the principle of the min-max operation fundamentally does not allow such easy deletion of zero grades. That is, the principle of the min-max operation requires the same operation on zero grades and non-zero grades in order to get a zero result from zero grade. The easy deletion of zero grades may cause incorrect results by detecting a minimum non-zero grade. To avoid such wrong operation, if a zero grade is deleted, a single bit of information is provided to inhibit further executions of minimum operation. By inhibiting further executions of minimum operation, the grade registers maintain an initial state "0" to indicate a latching of zero grades.

For the second reason, if any one of the rules included in an output label should not be included, then it must be excluded from min-max operations. As an identifier for the unused rules, J-K flipflop 410g is added.

Now, at the completion of min-max operations, each grade registers, for example each of eight grade registers per output channel, holds a non-zero grade as a result. These eight output label grades per output channel are transferred to the following stage, a defuzzifier, to be used in MAX defuzzification operations. To reduce execution time of the defuzzification operation, each full membership function for an output is replaced by corresponding singleton data which consists of a vertical line of unit length standing at the position of corresponding membership function's center of gravity. Each unit length singleton data is generated so as to have the length defined by the magnitude of associative output label's grade.

The Applicant's pending Japanese application "Defuzzification Method for Fuzzy Inference" filed on Oct. 7, 1992 with the filing number of 4-293698 discloses an approximate approach for reducing calculation time. The approximate approach uses only two largest height singleton data for calculating the center of gravity, instead of using all singleton data processed by MAX defuzzification. For this approximation approach, it is very convenient if the two largest output label grades are previously selected out of eight grade registers 31 through 38. An example circuit for selecting the largest two output label grades, according to another embodiment of the invention, is shown in FIG. 4.

Figure 4:
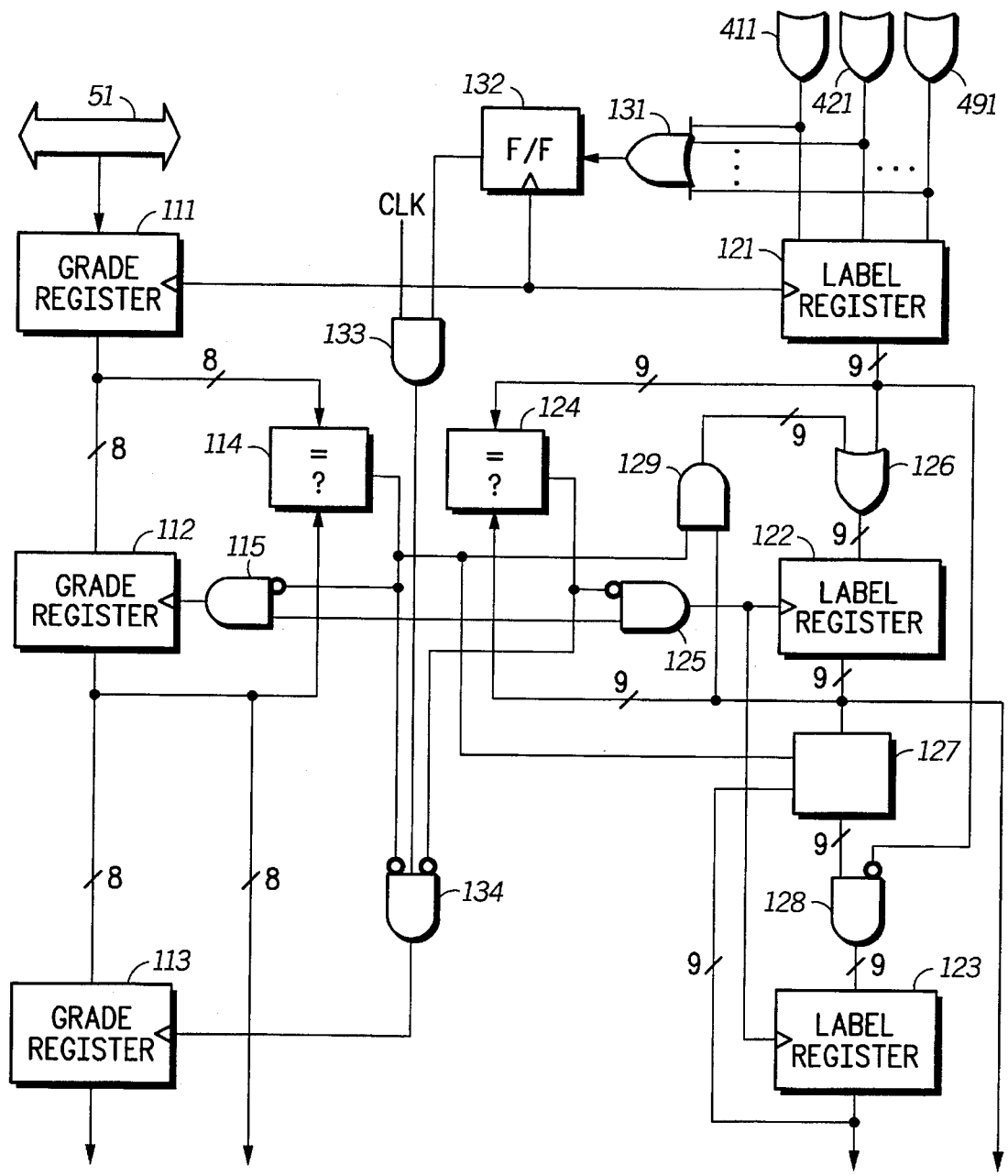
FIG. 4 is a detailed block diagram illustrating another structure of grade registers 31–38 as shown in FIG. 1.

Nine grade registers 31 through 38 of FIG. 1 are replaced with some elements in a selective latch circuit shown in FIG. 4. The same reference numbers are used in FIG. 4 for indicating the same elements as shown in FIG. 1. The selective latch circuit comprises a group of three cascaded grade registers 111 through 113, a group of three similarly cascaded three label registers 121 through 123, a grade matching detector 114 which detects matching between two grades stored in each register, and a label matching detector 124 which detects matching between two labels stored in each register.

Outputs of OR gates 411 through 481 are directly connected to output label register 121, while their logical sum of them is supplied to an input terminal of D-type flipflop 132 by OR gate 131. When any one of OR gates 411 through 481 outputs "1", D-type flipflop 132 is set to "1". A current grade appearing on grade bus 51 is always latched by grade register 111, the outputs of OR gates 411 through 481 is always latched by output label code register 121 simultaneously. The "output label code" is used to indicate the output label relevant to a current grade stored in the grade register 111 by bit position of "1". The grade stored in grade register 111 is compared with the contents of grade register 112 by comparator 114, while the output label code stored in the register 121 is compared with the contents of the register 122 by comparator 124.

Case A: The contents of label register 121 do not match the contents of label register 122 (different output label) and the contents of grade register 111 do not match the contents of the grade register 112 (different grade).

The contents of grade register 112 are transferred to grade register 113 and the contents of grade register 111 are transferred to grade register 112. Simultaneously the contents of label register 199 and inverted contents of label register 121 are AND'ed and then transferred to label register 123 through a switch 127 and an AND gate 128, while the contents of label register 121 are transferred to label register 122 through an OR gate 126.

Case B: The contents of label register 121 do not match the contents of label register 122 (different output label) but the contents of grade register 111 match the contents of grade register 112 (same grade).

The contents of the label register 122 and the inverted contents of label register 121 are AND'ed and then transferred to label register 123 through switch 127 and AND gate 128, while the contents of the label register 121 and the contents of label register 122 are OR'ed and then transferred to label register 122 through an OR gate 126.

Case C: The contents of label register 121 match the contents of the label register 122 (same output label) but the contents of grade register 111 do not match the contents of the grade register 112 (different grade).

The contents of the grade register 111 are transferred to grade register 112.

Case D: The contents of the label register 121 match the contents of label register 122 (same output label) and the contents of grade register 111 matches the contents of the grade register 112 (same grade).

No action takes place in this case.

In Case A, a new largest grade appeared on the grade bus 51 is latched into the grade register 111 and an older largest grade is transferred from the grade register 112 to the grade register 113 as a new next largest grade, while the contents of the grade register 111 are transferred to grade register 112 as the new largest grade. Accordingly the grade register 112 latches the largest grade appearing on the grade bus 51 and the grade register 113 latches the next largest grade appearing on the grade bus 51. The label registers 122 and 123 latch labels corresponding to the largest and next largest grade respectively. Storing an identical label in both label registers 122 and 123 can be prohibited by AND'ing the contents of the label registers 122 and the inverted contents of the label register 123 and then transferring the result to the label register 123. The contents of each register are transferred to a next stage, a defuzzifier, to get a final output data.

Figure 5:
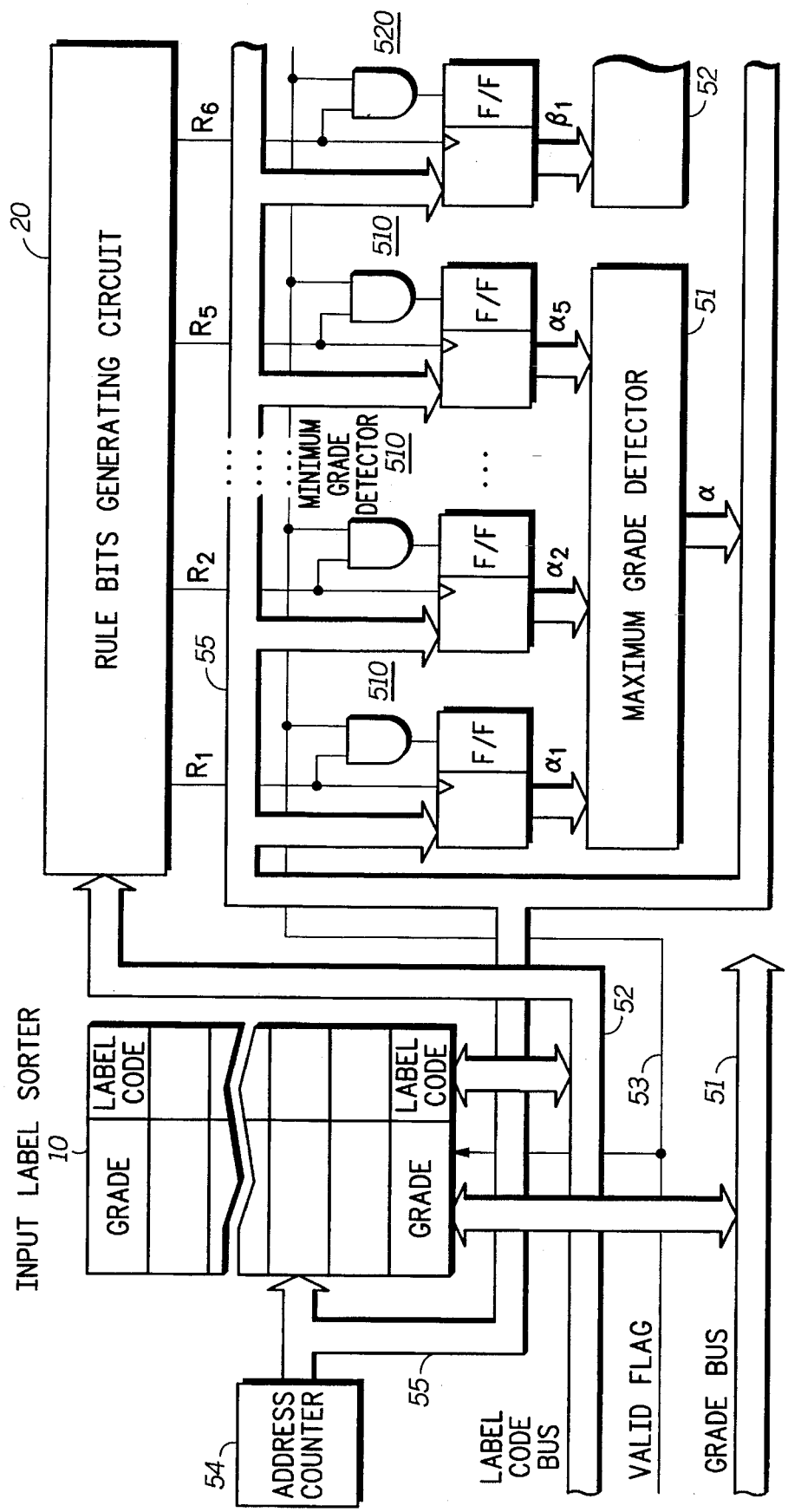
FIG. 5 is a block diagram of a min-max computing circuit according to another embodiment of the present invention.

FIG. 5 shows a block diagram illustrating a fuzzy inference min- max computing circuit according to another embodiment of the invention. Elements shown in FIG. 5 with the same reference numbers as in FIG. 1 are identical to the corresponding elements in FIG. 1, and therefore will not be explained here.

In this embodiment, after input label sorter 10 completes the sorting of input labels, address counter 54 outputs addresses onto address bus 55 in decreasing order (from large to small) of the corresponding grade's magnitude. The position of the sorted input grades in sorter 10 is referred to as a particular input label's "sort-pointer". Each minimum grade detector 510, 520, corresponding to a respective encoded rule bit generated in rule bits generating circuit 20 comprises a register, which latches a current sort-pointer from bus 55 whenever it detects a valid bit in encoded rule bits as one of rule-associative-bit-group supplied from the rule bits generating circuit 20.

As a result, the minimum grade detectors 510 latches the last sort-pointer corresponding to the minimum grade, which appears with the last valid bit. Each of the maximum grade detectors 511, 521 corresponding to output labels comprises a register, which selects and latches the maximum pointer among the minimum sort-pointers which have been stored in the minimum detectors 510, 520.

After the input label sorter 10 completes its output operation, the sort-pointers stored in group of the maximum grade detectors 511, 521 are output successively onto the bus 55 as read addresses for input label sorter 10. As a result, adequate input label grades are output on the grade bus 51 as the results of min-max operations for output labels.

Both an AND gate and a flipflop attached to each of minimum detectors 510, 520 are added for more efficient processing on zero grades. If a valid zero grade occurs during the rearrangement operation by input label sorter 10, the corresponding AND gate outputs "High" setting following flipflop. Minimum detectors which have their flip-flops set are inhibited from latching sort-pointers and are later excluded from a max comparison operation.

Figure 6:
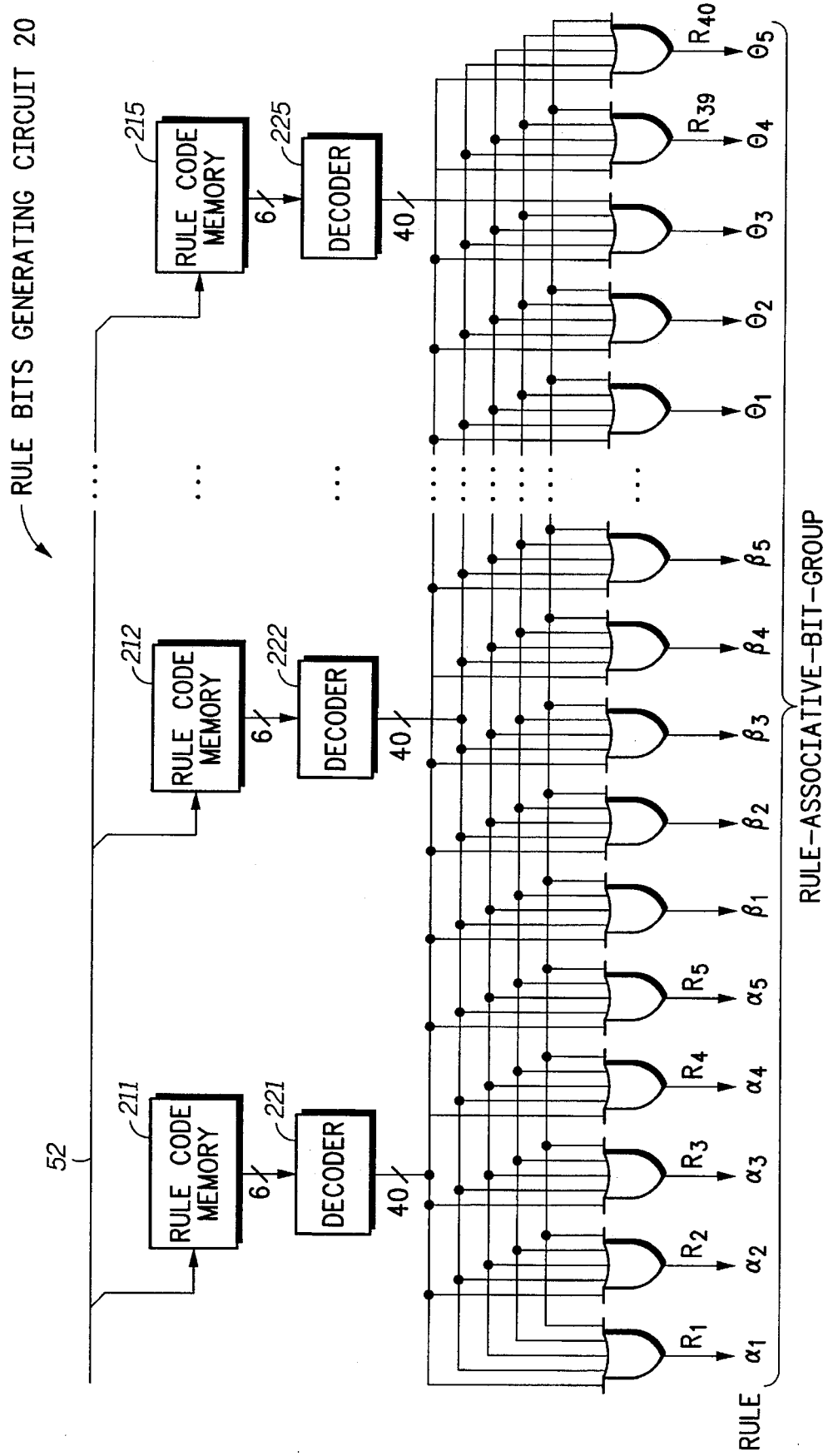
FIG. 6 is a detailed block diagram illustrating another structure of the rule bits generating circuit 20 shown in FIG. 1 and FIG. 5.

FIG. 6 is a block diagram illustrating the rule bits generating circuit 20 in FIGS. 1 and 5 according to another embodiment of the present invention. This rule bits generating circuit 20 generates rule-associative-bit-groups as mentioned above in reference to FIG. 13. Each of five rule code memories 211 through 215 stores rule codes for discriminating seventy two rules from each other in each of its seventy two addresses. Each of the rule codes is comprised of binary data of six bits to indicate at most five rules which have corresponding input label in their antecedent. For example, in the case shown in FIG. 13, each of the rule code memories 211, 212 . . . 215 stores each of the rule codes for discriminating each of the rules $a_1$, $a_2$, $e_1$, $z_1$, $h_3$, respectively in a location addressed by a label code of input label A. Each of the rule code memories 211, 212 . . . 215 also stores each of the rule codes for discriminating each of the rules $a_1$, $a_2$, $e_1$, $z_1$, $h_3$, respectively in a location addressed by a label code of input label B. A total number of rules is assumed to be forty, and three bits in each rule code are used to discriminate one of eight output labels a through q, while another part of three bits in each rule code are used to discriminate one of a maximum of five rules which can be included in each of output labels.

The rule codes read out from the rule code memories 211 through 215 are supplied to decoders 221 through 225 to be converted to arrangement of forty bits. Each of the forty bits is distributed to one of five input terminals of the forty OR gates arranged to correspond to each of the forty rules, respectively to output the rule-associative-bits-group of forty valid/invalid bits $R_1$ through $R_{40}$.

Figure 7:
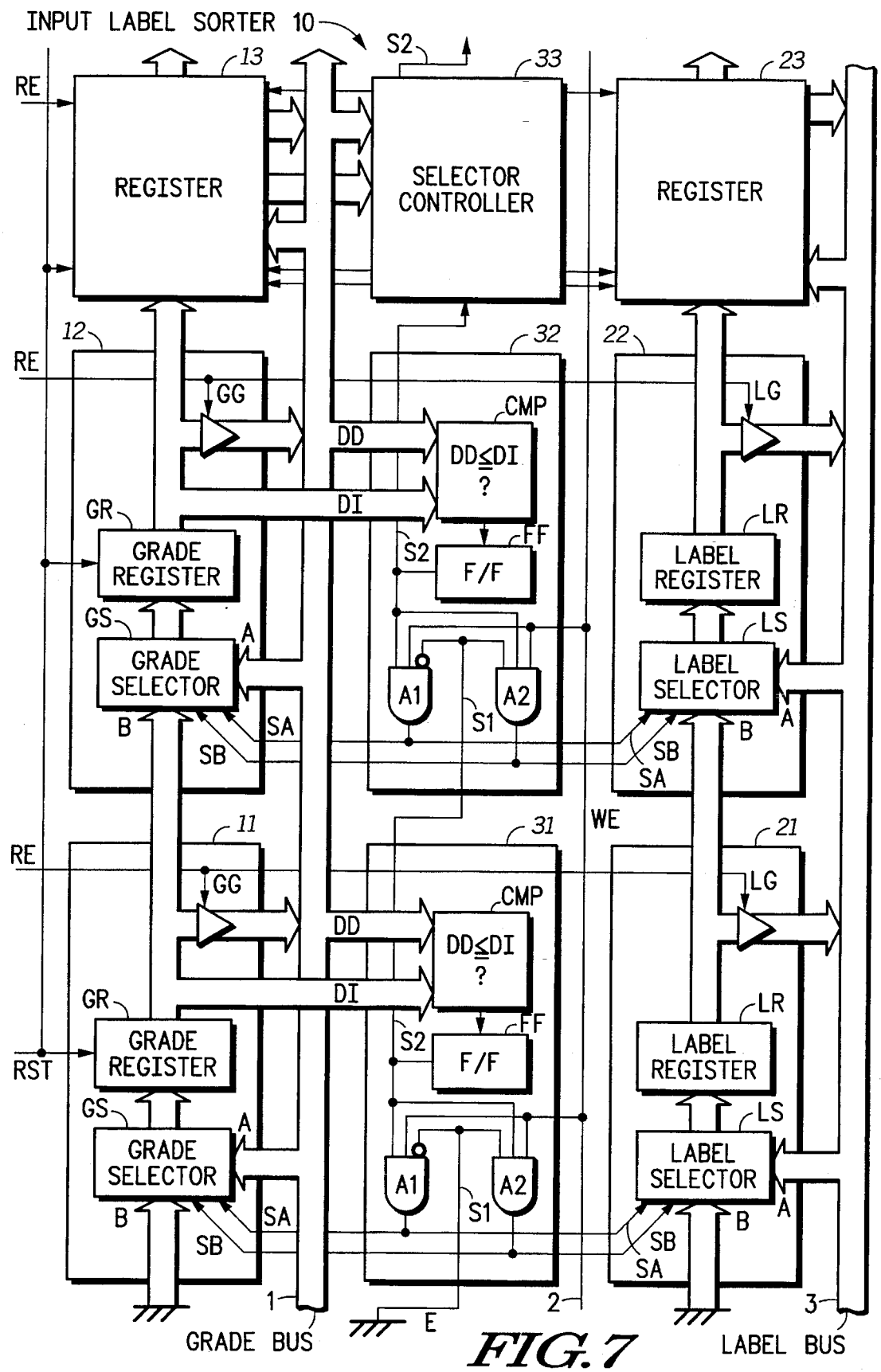
FIG. 7 is a detailed block diagram illustrating an example of the structure of an input label sorter 10 shown in FIG.1 and FIG. 5.

FIG. 7 is a detailed block diagram illustrating the data sorting circuit 10 shown in FIG. 1. The data sorting circuit includes a grade bus 1 for transmitting input label's grades output from a preceding grade estimator (not shown), a label bus 2 for transmitting the input label (code) associated with the grade concurrently appearing on grade bus 1, and a write enable (WE) signal line 3, on which a logically high level signal appears only when an input label's grade on data bus is non-zero.

The data sorting circuit also includes a group of cascaded registers 11, 12, 13, . . . and 21, 22, 23, . . . each of which has a 2-input selector at its input, and a group of cascaded selector controllers 31, 32, 33, . . . each of which controls the selecting operation of its associated selector.

More specifically each of registers 11, 12, 13, . . . includes a grade register GR and a 2-input grade selector GS placed at the input of grade register GR. One input A of grade selector GS is connected to grade bus 1 and the other input B is connected to the output of the preceding stage grade register GR. The output of grade selector GS is connected to its associated grade register GR.

Each of registers 21, 22, 23, ... includes a label register LR and a 2-input label selector LS placed at the input of label register LR. One input A of label selector LS is connected to label bus 3 and the other input B is connected to the output of the preceding stage label register LR. The output of label selector LS is connected to its associated label register LR.

The data sorting circuit further includes a group of cascaded selector controllers 31, 32, 33, ..., each of which is connected between its associated grade selector GS and label selector LS. Each selector controller includes a comparator CMP for performing a magnitude comparison between grade Di stored in its associated grade register GR and data DD appearing on grade bus 1, a D-type flip-flop FF for storing the comparison result of comparator CMP, and a logic circuit which includes a pair of AND gates A1 and A2. Comparator CMP belongs to each stage controller and outputs a High value to flip-flop FF when DD Di.

Before an input label's grades appear on grade bus 1, grade register GR of each stage register 11, 12, 13, is initialized to a initial value by a reset signal supplied from a signal line RST. The initial value may be [FF]H if input label's grades have 8-bit widths.

After resetting grade registers GR, a grade estimator (not shown) in the preceding stage sequentially outputs an input label's grades onto grade bus 1 and its associated input label codes onto label bus 3. When a current grade appearing on grade bus 1 is a valid data with a non-zero value, the grade estimator also provides a write enable signal (WE) which allows latching the currently appearing grade onto line 2.

When the first non-zero grade DD1 appears on grade bus 1 on the rising edge of a clock signal (not shown), a comparator CMP in each of selector controllers 31, 32, 33, compares grade DD1 with grade Di (=FF) stored in its associated grade register GR. Comparator CMP in every stage outputs a high level signal because DD1 is smaller than the stored initial value [FF]. The D-type flipflop FF in each stage latches the high level signal on the of falling edge of the clock signal, and outputs a high level onto a signal line S2 to notify the subsequent stage that the comparison result of its own stage was DD1 Di.

In every selector controller other than the first stage selector controller, the above described signal S2 is received by logic circuits A1 and A2 as a signal S1. The first stage selector controller 31 receives a constant low level signal on signal line S1 because there is no preceding stage.

Therefore, in the case of the comparison result DD1 Di, the outputs of the first stage AND gates A1 and A2 are high (H) and low (L) respectively. The associated grade selector GS receiving the combination (H, L) connects grade bus 1 to its associated grade register GR at the rising edge of the clock signal, thus the first grade DD1 appeared on grade bus 1 is transferred to the first stage grade register GR.

On the other hand, in each of the second stage and the following selector controllers 32, 33, 34, AND gates A1 and A2 output L and H respectively, because the high level signal from the preceding stage exists on signal line S1. The associated grade selector GS receiving the combination (L, H) connects the preceding grade register GR to its associated grade register GR on the falling edge of the clock signal. Thus, the initial value [FF] stored in each of the preceding registers 11, 12, 13, is shifted out to the subsequent registers 12, 13, 14, ...

When the second non-zero grade DD2 appears on grade bus 1, either one of two different data transferring operation takes place depending upon the comparison result between DD2 and DD1. The case of DD2 DD1 is described below.

The first stage selector controller 31 compares new grade DD2 with grade DD1 stored in its associated grade register GR. In this case, the fact DD DD1 causes the associated grade selector GS to perform a similar operation to the DD1's case and the new grade DD2 is stored into grade register GR in register 11 at the falling edge of the clock signal.

In each of the second stage and the following selector controllers 32, 33, 34, AND gates A1 and A2 output (L, H) respectively. Thus data DD1 and the initial value [FF] stored in grade registers GR 11, 12, 13, ... are shifted to the subsequent registers on the falling edge of the clock signal, in a similar manner to the case of storing DD1.

As a result, the first stage grade register GR of register 11 stores grade DD2, and the second stage grade register GR of register 12 stores grade DD1. The third stage and the following grade registers GR of registers 13, 14, ... store the initial values [FF].

Next, the case of DD2> DD1 is described below. In this case, the first stage comparator CMP in selector controller 31 outputs Low level signal and the output combination of AND gates A1 and A2 becomes —L, L—. The first stage grade selector GS of register 11 does not connect either input terminal A or B to its associated grade register GR. Thus, the first stage grade register GR of register 11 maintains grade DD1 stored previously.

The second stage comparator CMP in selector controller 32 outputs a high level, because its associated grade register holds the maximum value [FF]. On the other hand, the comparison result of the first stage selector controller 31 outputs a low level on signal line S2. Thus the combination of the second stage AND gates A1 and A2 becomes —H, L—. The second stage grade selector GS of register 12 connects grade bus 1 to its associated grade register GR. As a result, the second stage grade register GR stores a current grade DD2 (> DD1).

In the third stage and the following stages, the comparison results of selector controllers 33, 34, ... are high levels and the preceding stage's comparison results are also high levels. Thus, the combination of AND gates A1 and A2 becomes —L, H—. As a result, registers 13, 14, ... receive the initial values [FF] shifted out from the preceding registers 12, 13, ...

As described above, the first stage grade register GR of register 11 stores the smaller one of grade DD1 and DD2. The larger one is stored in the second stage grade register GR of register 12.

The data transferring operations described above are summarized as follows:

A. The first stage selector controller

A1) transfers a currently appearing grade from grade bus 1 to an associated grade register if the current grade is equal to or less than the grade already stored in the associated grade register; or A2) performs no data transfer to its associated grade register if a current grade on grade bus 1 is greater than the grade already stored in the associated grade register.

B. Each of the second stage and the following selector controllers

B1) shifts the grade stored in the preceding grade register to an associated grade register if a current grade appearing on grade bus 1 is equal to or less than both of the grades stored in its associated and the preceding grade registers;

B2) transfers a currently appearing grade from grade bus 1 to an associated grade register if the current grade is greater than the grade stored in the preceding stage's grade register but equal to or less than the grade stored in its associated stage's grade register; or B3) performs no data transfer and maintains the grade previously stored in its associated stage's grade register if a current grade appearing on grade bus 1 is greater than the grade stored in the associated grade register.

If membership functions for input labels included in input data channels of fuzzy inference are defined such that only neighboring two membership functions can cross each other, then at most two non-zero grades can be outputted from each of input data channels. Therefore, by choosing the numbers of registers' stages to be equal to two times of the number of input data channels, all of non-zero grades can be sorted in grade registers GR.

As described above, zero-grades are processed efficiently to improve the processing speed and to reduce hardware size. However, a threshold value greater than zero can be used to efficiently process the grades which are less than the threshold value. The embodiment in FIG. 5 shows that sort-pointers (entry addresses) are output in decreasing order of grade magnitude. However, another apparent modification might be included in this invention. For example, input label sorter 10 may output input label grades themselves in decreasing order of their magnitude. Then each of the maximum grade detectors 511, 521, can detect the maximum grade from the group of minimum grades. In the embodiment shown in FIG. 1 each maximum grade detector having multiple logic circuits 40 is provided corresponding to each of output channels. However, an alternative architecture might be used where single logic circuit and/or single maximum grade detector can be used in time-sharing manner for multiple output labels/channels to reduce hardware size.

We claim:

1. A data processing system for performing a fuzzy inference operation, comprising:

bus means for transferring a plurality of input labels, a plurality of grades, and a plurality of valid bits, each of the plurality of input labels corresponding to one of the plurality of grades and each of the plurality of valid bits corresponding to the plurality of input labels;

an input label sorter for receiving the plurality of input labels and the plurality of grades, the input label sorter sorting a first portion of the plurality of grades in a first order based on magnitude, the input label sorter sorting each of the plurality of input labels and storing each of the plurality of input labels in a memory location which corresponds to a one of the first portion of the plurality of grades;

a rule bits generating circuit coupled to the input label sorter for receiving the plurality of input labels corresponding to the first portion of the plurality of grades in a second order based on magnitude, the rule bits generating circuit successively comparing each of the plurality of input labels with a first one of a plurality of antecedents of a first rule and selectively asserting a first rule signal each time one of the plurality of input labels corresponds to the first one of the plurality of antecedents of the first rule, the rule bits generating circuit concurrently successively comparing each of the plurality of input labels with a first one of the plurality of antecedents of a second rule and selectively asserting a second rule signal each time one of the plurality of input labels corresponds to the first one of the plurality of antecedents of the second rule;

a minimum determination circuit coupled to the rule bits generating circuit to indicate a first minimum value corresponding to the first rule and a second minimum value corresponding to the second rule, the minimum determination circuit indicating the first minimum value when the first rule signal is first asserted and a first corresponding one of the plurality of valid bits is in a first logic state which inhibits determination of the first minimum value and the minimum determination circuit indicating the second minimum value when the second rule signal is first asserted and a second corresponding one of the plurality of valid bits is in a second logic state which inhibits determination of the second minimum value;

a maximum determination circuit coupled to the minimum determination circuit, the maximum determination circuit asserting an enable signal when one of the first minimum value and the second minimum value is asserted; and latch means coupled to the maximum determination circuit for receiving the enable signal and coupled to the bus means for selectively receiving the plurality of grades, the latch means latching a one of the plurality of grades when the enable signal is asserted, wherein a last one of the plurality of grades latched by the latch means is a first maximum output value.

2. The data processing system for performing the fuzzy inference operation of claim 1 wherein each of the first portion of the plurality of grades has a non-zero value and each of a remaining portion of the plurality of grades has a zero value.

3. The data processing system for performing the fuzzy inference operation of claim 1 wherein each of the first portion of the plurality of grade is above a predetermined threshold value.

4. The data processing system for performing the fuzzy inference operation of claim 1 wherein the first order in which the first portion of the plurality of grades is stored is based on increasing magnitude.

5. The data processing system for performing the fuzzy inference operation of claim 1 wherein the second order in which the rule bits generating circuit receives the input labels is based on decreasing magnitude.

6. The data processing system for performing the fuzzy inference operation of claim 1 wherein the rule bits generating circuit, comprises:

a first plurality of label code registers, each of the first plurality of label code registers storing one of the plurality of antecedents of the first rule;

a first plurality of comparators, each of the first plurality of comparators being coupled to one of the first plurality of label code registers for a corresponding one of the plurality of antecedents of the first rule, each of the first plurality of comparators being coupled to the input label sorter for receiving each of the plurality of input labels, each of the first plurality of comparators comparing a one of the plurality of antecedents of the first rule stored therein with each of the plurality of input labels, each of the first plurality of comparators asserting one of a plurality of first match signals when the one of plurality of antecedents of the first rule stored therein equals one of the plurality of input labels; and first logic means coupled to each of the first plurality of comparators for receiving the plurality of first match signals, the first logic means asserting the first rule signal when one of the plurality of first match signals is asserted.

7. The data processing system for performing the fuzzy inference operation of claim 6 wherein the rule bits generating circuit further comprises:

a second plurality of label code registers, each of the second plurality of label code registers storing one of the plurality of antecedents of the second rule;

a second plurality of comparators, each of the second plurality of comparators being coupled to one of the second plurality of label code registers for a corresponding one of the plurality of antecedents of the second rule, each of the second plurality of comparators being coupled to the input label sorter for receiving each of the plurality of input labels, each of the second plurality of comparators comparing a one of the plurality of antecedents of the second rule stored therein with each of the plurality of input labels, each of the second plurality of comparators asserting one of a plurality of second match signals when the one of plurality of antecedents of the second rule stored therein equals one of the plurality of input labels; and second logic means coupled to each of the second plurality of comparators for receiving the plurality of second match signals, the second logic means asserting the second rule signal when one of the plurality of second match signals is asserted.

8. The data processing system for performing the fuzzy inference operation of claim 1 wherein the maximum determination circuit is a digital OR gate.

9. The data processing system for performing the fuzzy inference operation of claim 1, further comprising:

an address counter for determining a plurality of addresses corresponding to the plurality of grades and the plurality of input labels, the address counter determining a plurality of sort-pointers in the second order based on magnitude.

10. The data processing system for performing the fuzzy inference operation of claim 9 wherein the rule bits generating circuit, comprises:

a rule code memory for storing a plurality of rules, the rule code memory storing a first plurality of antecedents corresponding to a first one of the plurality of rules, the rule code memory being coupled to the input label sorter for receiving the input labels corresponding to the first portion of the plurality of grades in the second order based on magnitude and generating a first plurality of rule codes in response thereto;

a decoder coupled to the rule code memory for receiving the first plurality of rule codes, the decoder decoding the first plurality of rule codes to generate a first plurality of decoded signals; and first logic means coupled to the decoder for receiving the first plurality of decoded signals, the first logic means logically combining the first plurality of decoded signals to generate a first plurality of rule signals.

11. The data processing system for performing the fuzzy inference operation of claim 10 wherein the rule code memory stores a first plurality of antecedents corresponding to a second one of the plurality of rules and generates a second plurality of rule codes in response thereto.

12. The data processing system for performing the fuzzy inference operation of claim 11 wherein the decoder decodes the second plurality of rule codes to generate a second plurality of decoded signals.

13. The data processing system for performing the fuzzy inference operation of claim 12 wherein the rule bits generating circuit further comprises:

second logic means coupled to the decoder for receiving the second plurality of decoded signals, the second logic means logically combining the first plurality of decoded signals and the second plurality of decoded signals to generate a second plurality of rule signals.

14. A method for performing a fuzzy inference operation, comprising the steps of:

receiving a plurality of input labels, a plurality of grades, and a plurality of valid bits via a bussing means, each of the plurality of input labels corresponding to one of the plurality of grades;

sorting a first portion of the plurality of grades in a first order based on magnitude and storing each of the plurality of input labels in a position relative to a corresponding one of the first portion of the plurality of grades, an input label sorter coupled to the bussing means for receiving the first portion of the plurality of grades;

successively comparing each of the plurality of input labels with a first one of a plurality of antecedents of a first rule, a rule bits generating circuit coupled to the input label sorter for receiving the plurality of input labels;

selectively asserting a first rule signal each time one of the plurality of input labels corresponds to the first one of the plurality of antecedents of the first rule;

concurrently successively comparing each of the plurality of input labels with a first one of the plurality of antecedents of a second rule;

selectively asserting a second rule signal each time one of the plurality of input labels corresponds to the first one of the plurality of antecedents of the second rule;

determining a first minimum value corresponding to the first rule and a second minimum value corresponding to the second rule, a minimum determination circuit coupled to the rule bits generating circuit for indicating the first minimum value when the first rule signal is first asserted and a first corresponding one of the plurality of valid bits is in a first logic state which inhibits determination of the first minimum value, the minimum determination circuit indicating the second minimum value when the second rule signal is first asserted and a second corresponding one of the plurality of valid bits is in a second logic state which inhibits determination of the second minimum value;

asserting an enable signal when one of the first minimum value and the second minimum value is asserted; and selectively storing a one of the plurality of grades in a latch circuit when the enable signal is asserted, wherein a last one of the plurality of grades latched by the latch circuit is a first maximum output value, the latch circuit being coupled to the minimum determination circuit for receiving the one of the plurality of grades.

15. The method of claim 14 wherein each of the first portion of the plurality of grades has a non-zero value and each of a remaining portion of the plurality of grades has a zero value.

16. The method of claim 14 wherein the first order in which the first portion of the plurality of grades is stored is based on increasing magnitude.

17. The method of claim 14 further comprising the step of:

outputting the input labels corresponding to the first portion of the plurality of grades in a second order based on magnitude.

18. The method of claim 17 wherein the second order in which the rule bits generating circuit receives the input labels is based on decreasing magnitude.

* * * * *